US009872089B2

(12) United States Patent
Ha et al.

(10) Patent No.: US 9,872,089 B2
(45) Date of Patent: Jan. 16, 2018

(54) WIRELESS DATA AND POWER TRANSFER OVER AN INDUCTIVE TELEMETRY LINK

(71) Applicant: THE REGENTS OF THE UNIVERSITY OF CALIFORNIA, Oakland, CA (US)

(72) Inventors: Sohmyung Ha, Abu Dhabi (AE); Gert Cauwenberghs, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/316,835

(22) PCT Filed: Jun. 9, 2015

(86) PCT No.: PCT/US2015/034944
§ 371 (c)(1),
(2) Date: Dec. 6, 2016

(87) PCT Pub. No.: WO2015/191612
PCT Pub. Date: Dec. 17, 2015

(65) Prior Publication Data
US 2017/0118543 A1    Apr. 27, 2017

Related U.S. Application Data

(60) Provisional application No. 62/009,699, filed on Jun. 9, 2014.

(51) Int. Cl.
*G08C 19/06* (2006.01)
*G08C 19/12* (2006.01)
(Continued)

(52) U.S. Cl.
CPC .............. *H04Q 9/00* (2013.01); *H04B 5/0037* (2013.01); *H04B 5/0075* (2013.01); *H04Q 2209/40* (2013.01); *H04Q 2209/88* (2013.01)

(58) Field of Classification Search
CPC .. H04Q 9/00; H04Q 2209/88; H04Q 2209/40; H04B 5/0075; H04B 5/0037
See application file for complete search history.

(56) References Cited

U.S. PATENT DOCUMENTS 9,474,031 B1 * 10/2016 Sedzin ............... H04W 52/243
2009/0281597 A1   11/2009 Parramon et al.
(Continued)

FOREIGN PATENT DOCUMENTS

WO    2008069444 A1    6/2008
WO    2012172092 A1    12/2012
WO    2014069782 A1    5/2014

OTHER PUBLICATIONS

Demosthenous, Andreas; Advances in Microelectronics for Implantable Medical Devices; Advances in Electronics, vol. 2014, Artcle ID 981295, 21 pgs.
(Continued)

*Primary Examiner* — Erin File
(74) *Attorney, Agent, or Firm* — Eleanor Musick; Musick Davison LLP

(57) ABSTRACT

A telemetry device includes a resonant inductive link with a primary LC tank and secondary LC tank configured to resonate at a carrier frequency. A modulator assembly in communication with the secondary LC tank implements data-synchronized cyclic on-off keying modulation (COOK) to periodically create a short across the secondary LC tank in response to a pulse from a phase selector and phase-locked loop. During the full cycle-length of the short, data can be transmitted across the inductive link while the charge across the secondary LC tank is preserved. Power may be transferred across the link during non-shorted cycles.

13 Claims, 11 Drawing Sheets

(51) Int. Cl.
*H04Q 9/00* (2006.01)
*H04B 5/00* (2006.01)

(56) References Cited

U.S. PATENT DOCUMENTS

| | | | |
|---|---|---|---|
| 2012/0153740 A1 | 6/2012 | Soar | |
| 2012/0197352 A1 | 8/2012 | Carbunaru et al. | |
| 2012/0294386 A1 | 11/2012 | Ghovanloo et al. | |
| 2013/0148828 A1 | 6/2013 | Fort et al. | |
| 2014/0097791 A1* | 4/2014 | Lisuwandi | H01F 38/14 320/108 |
| 2014/0113561 A1* | 4/2014 | Maguire | H04B 5/0037 455/41.2 |
| 2014/0273835 A1* | 9/2014 | Ghovanloo | H04B 5/0037 455/41.1 |
| 2014/0306807 A1* | 10/2014 | Rowland | H04Q 9/00 340/10.3 |
| 2014/0312702 A1* | 10/2014 | Uchida | H02J 17/00 307/80 |
| 2016/0036244 A1* | 2/2016 | Griffith | H04B 5/0031 307/104 |
| 2016/0072301 A1* | 3/2016 | Maniktala | H04B 5/0037 307/104 |
| 2016/0126771 A1* | 5/2016 | Aghassian | H02J 7/025 320/108 |
| 2016/0220394 A1* | 8/2016 | Griffith | A61B 5/0031 |

OTHER PUBLICATIONS

Ha et al., Energy recycling integrated 6.78Mbps data 6.3mW power telemetry over a single 13.56MHz inductive link, IEEE Xplore Digital Library, 2014 Symposium on VLSI Circuits Digest of Technical Papers; Jun. 10, 2014, 2 pgs.

Inanou et al. A 10.2 Mbps Pulse Harmonic Modulation Based Transceiver for Implantable Medical Devices, IEEE Journal of Solid-State Circuits, vol. 46, No. 6, Jun. 2011, pp. 1296-1306.

Kiourti, Asimina, Biomedical Telemetry: Communication Between Implanted Devices and the External World, Opticon1826, Issue 8, Spring 2010, 7 pgs.

PCT/2015/034944, International Search Report and Written Opinion dated Sep. 4, 2015, 11 pages.

Viventi, J. et al., Flexible, foldable, actively multiplexed, high-density electrode array for mapping brain activitiy in vivo, Nature Neuroscience, Advance Online Publication, published online Nov. 13, 2011; doi: 10.1038/nn.2973, 9 pgs.

* cited by examiner

WIRELESS DATA AND POWER TRANSFER OVER AN INDUCTIVE TELEMETRY LINK

RELATED APPLICATIONS

This application is a 371 national stage filing of International Application No. PCT/US2015/034944, filed Jun. 9, 2015, which claims the benefit of the priority of U.S. Application No. 62/009,699, filed Jun. 9, 2014, which is incorporated herein by reference in its entirety.

FIELD OF THE INVENTION

The invention relates to a method and apparatus for efficiently transmitting power and data wirelessly over an inductive telemetry link, and more specifically to a modulation scheme for high bit rate, low BER data transfer with low power consumption.

BACKGROUND OF THE INVENTION

Implantable medical devices provide therapy to treat numerous health conditions as well as monitoring and diagnosis. Over the years, the development of these devices has seen remarkable progress due to tremendous advances in microelectronics, electrode technology, packaging and signal processing techniques. Many of today's implantable devices use wireless technology to perform the dual functions of supplying power and providing communication. There are many challenges when creating an implantable device. Issues such as reliable and fast bidirectional data communication, efficient power delivery to the implantable circuits, low noise and low power for the recording part of the system, and delivery of safe stimulation to avoid tissue and electrode damage are some of the challenges faced by the microelectronics circuit designer.

Neuroengineering, the application of engineering techniques to understand, repair, replace, enhance, or otherwise exploit the properties of neural systems, is a topic that has garnered considerable interest in the research community. The nervous system is a complex network of neurons and glial cells. It comprises the central nervous system (brain and spinal cord) and the peripheral nervous system. Injuries or diseases that affect the nervous system can result in some of the most devastating medical conditions. Conditions, such as stroke, epilepsy, spinal cord injury, and Parkinson's disease, to name but a few, as well as more general symptoms such as pain and depression, have been shown to benefit from implantable medical devices. These devices are used to bypass dysfunctional pathways in the nervous system by applying electronics to replace lost function.

The first implantable medical devices were introduced in the late 1950s with the advent of the heart pacemaker and subsequently the cochlear implant. Both have restored functionality for hundreds of thousands of patients. A pacemaker uses electronics and sensors to continuously monitor the heart's electrical activity and when arrhythmia is detected, electrical stimulus is applied to the heart (via electrodes) to regulate its speed. A cochlear implant uses electronics to detect and encode sound and then stimulate the auditory nerve to enable deaf individuals to hear.

Implanted medical devices (IMDs) for multi-channel biosignal recording require a high data rate for the uplink while being powered wirelessly. High-density recording of neural spikes, local field potential (LFP) or electrocoticogram (ECoG), etc., with more than 100 channels is required for advanced brain-computer interface (BCI) applications and research. One example for BCI implants is the flexible active ECoG array described by Viventi, et al. in *Nature Neuroscience*, Col. 14, No. 12, pp. 1599-1605, 2011, which is designed for subdural placement. The key elements of such implanted BCI devices are electrode, sensing, signal processing (analog and digital), data communication, and power harvesting and management. A key challenge with respect to power and data telemetry for this device, and others, comes from where it needs to be placed—within a very limited space in the body. Other obstacles include that the rate uplink telemetry requires a high data for transmission of recorded data. For example, ECoG with 1024 channels (at 600 S/s×10 bits) requires 6.15 Mbps, and Neural Spikes & LFP with 128 channels (at 5 kS/s×10 bits) requires 6.4 Mbps. This over 6 Mbps data rate is challenging because of its very limited amount of power, which is transferred wirelessly.

Possible solutions for power and data (especially uplink data) telemetry include single link and multiple link. The most viable solution for power transfer uses a pair of inductors, where data are also transferred through the same link for power transfer. Load shift keying (LSK), a widely used modulation scheme for uplink data telemetry, trades off power transfer and data-rate based on the coil's quality factor Q. This modulation scheme is based on the reflection of the implant's load to the transmitter via the inductive link. The binary data stream shorts the implant coil and the change in impedance is reflected in the transmitter because the implant load is much larger than the on-resistance of the switch transistor. High power transfer efficiency requires high Q, normally restricting the data rate due to the long rectification-off time. Where only two coils are used (for both power and data), there is a risk of disruption in power delivery if the short is applied for too long to the implant coil. When communication is in idle mode, the link should be optimized for maximum power transfer. The bandwidth of LSK is limited by the coupling factor, the parameters of the coils, and the transient response of the inductive link. Data rates of 100-500 kbps with simultaneous power transfer have been achieved by LSK, and a few Mbps using multiple dedicated inductive links for data transfer and power transfer. Using transient response from phase shifts by shorting the secondary LC tank for a half cycle has reportedly achieved 0.858-Mbps data rate with power transfer over single inductive link. However, this scheme loses energy whenever shorting the LC tank because of the subsequent reversal of LC resonance and the recovery time after transmitting one bit limits the data rate.

Although major advances have been achieved in the field of wireless communications and wireless powering for implants, further improvements in terms of new techniques that allow better optimization of the entire system are needed. Transceivers based on conventional wideband wireless radio technology are emerging. Approaches using higher RF bands require additional complexity in circuits and antenna structures, including sophisticated power management circuitry. These are expected to continue to offer improved performance in terms of an increase in output data rate with lower power consumption requirements, as smaller geometry silicon processing technologies are used for the implementation of the implantable circuits.

BRIEF SUMMARY OF THE INVENTION

According to embodiments of the invention, a method and apparatus are provided for efficiently transmitting both power and data wirelessly over a single inductive link. The link is bidirectional, and power and data can be transferred from and to either side. The inventive system and method also provides for efficient conversion and regulation of power at multiple digitally adjustable supply and stimulation voltage levels, possibly time varying, on either side. In one implementation, the inventive technology can be used to link from/to a medical implant for wireless recording and stimulation, and more generally in applications of wireless sensing and actuation in size and power constrained environments, where batteries cannot be conveniently integrated or replaced.

In exemplary embodiments, a method and apparatus are provided for energy-recycling data and power telemetry across a single inductive link between at least two separated sites. Each site contains a single inductor-capacitor (LC) tank, resonant at the same frequency, to receive and/or transmit power and/or data simultaneously. Data-driven synchronized single-cycle shorting of the LC tank conserves reactive power received, while inducing an instantaneous voltage change in at least another site LC tank to send data. Cyclic on-off keying (COOK) time-encoded symbol mapping of the shorting cycle allows transmission of two data bits per four carrier cycles with simultaneous power transfer during non-shorting cycles. Power is received and rectified, or modulated and transmitted, over the link by closing switches between the LC tank and one or more capacitors feeding to local voltage supplies and/or stimulators. All switch timing control signals for rectification and data transmission are generated from a low-power clock recovery comparator and multi-phase phase-locked loop.

Providing a significant advancement over the existing art, the present invention allows transmission of broadband data at a bit rate of half the carrier frequency while efficiently transmitting power over the same resonant inductive link. Using novel synchronous cyclic on-off keying (COOK), the device retains almost all stored energy in the LC (inductor-capacitor) resonant tank during modulation of the carrier signal. Hence, it is able to achieve very high data rate with very low power.

In addition, the invention uses a multi-phase phase-locked loop (PLL) to control timing in waveform sampling from the sinusoidal voltage signal in the LC tank to adiabatically convert and regulate power in generating multiple constant voltage supplies and/or time-varying stimulation voltage signals. This feature allows the device to perform precise supply and waveform control with minimum power losses, saving energy and avoiding heating of biomedical implants and other wireless sensors and actuators.

In one aspect of the invention, a telemetry device comprises an inductive link comprising an external LC tank and an internal LC tank; a switch configured for shorting the internal LC tank in response to a data-synchronized modulation signal; and a modulator assembly configured to implement cyclic on-off keying to open and close the switch, wherein the switch is closed for data transmission and open for power transfer. In some embodiments, the modulator assembly comprises a full wave rectifier; a clock-recovery comparator; a multi-phase phase-locked loop configured for generating a plurality of pulses; and a phase selector configured to select at least one pulse from the plurality of pulses; wherein the rectifier receives the selected pulse from the phase selector. In a preferred embodiment, the inductive link is resonant at a carrier frequency comprising a plurality of cycles, where the carrier frequency is 13.56 MHz. The data bit rate may be on the order of one half of the carrier frequency. In the modulator assembly, the phase selector, which uses feedback phase selection, selects a first pulse for closing the switch and a second pulse for opening the switch. The telemetry device may further include a data decoder configured for receiving an input data transmission, where the data decoder comprising a peak detector and a comparator. The data decoder may further include a peak-aligning diode configured to set a threshold voltage at the external LC tank.

In another aspect of the invention, a telemetry device comprises a resonant inductive link comprising a primary LC tank and secondary LC tank configured to resonate at a carrier frequency comprising a plurality of cycles; a modulator assembly in communication with the secondary LC tank and configured to implement cyclic on-off keying modulation to periodically create a short across the secondary LC tank in response to a pulse, wherein data is transmitted across the inductive link when the secondary LC tank is shorted and power is transferred across the inductive otherwise. The modulator assembly comprises a switch configured for creating the short; a full wave rectifier configured for controlling the switch; a multi-phase phase-locked loop configured for generating a plurality of pulses; a clock-recovery comparator configured to provide an input to the phase-locked loop; and a phase selector configured to select at least one pulse from the plurality of pulses for input to the rectifier. The modulator assembly preferably causes the switch to close for a full cycle within the plurality of cycles. The data has a bit rate on the order of one-half of the carrier frequency. Within the modulator assembly, the phase selector uses feedback phase selection and selects a first pulse for closing the switch and a second pulse for opening the switch.

In still another aspect of the invention, in a telemetry device comprising an inductive link comprising an external LC tank and an internal LC tank, a method for data transmission and power transfer comprises modulating a carrier signal using cyclic on-off keying modulation. The carrier signal comprises a plurality of cycles and the cyclic on-off keying modulation is configured to induce a short across the internal LC tank for a full cycle within the plurality of cycles. The cyclic on-off keying modulation is effected by providing input to a full wave rectifier from a phase selector configured to select a pulse from a plurality of pulses output by a multi-phase phase locked loop in response to input from a clock recovery comparator configured to recover a clock from the internal LC tank.

In yet another aspect of the invention, a method for transmitting power and data over a resonant inductive link having a primary LC tank and a secondary LC tank comprises modulating a carrier signal using cyclic on-off keying, the carrier signal comprising a plurality of cycles, wherein a short is formed across the secondary LC tank for a full cycle of the plurality of cycles, wherein data is transmitted during the full cycle. In a preferred embodiment, the cyclic on-off keying modulation is effected by providing input to a full wave rectifier from a phase selector configured to select a pulse from a plurality of pulses output by a multi-phase phase locked loop in response to input from a clock recovery comparator configured to recover a clock from the internal LC tank.

DETAILED DESCRIPTION OF EMBODIMENTS OF THE INVENTION

According to embodiments of the present invention, synchronous cyclic on-off keying (COOK) is exploited to retain almost all stored energy in the LC (inductor-capacitor) resonant tank during modulation of the carrier signal, thus providing the ability to achieve very high data rate with very low power consumption.

Figure 1A:
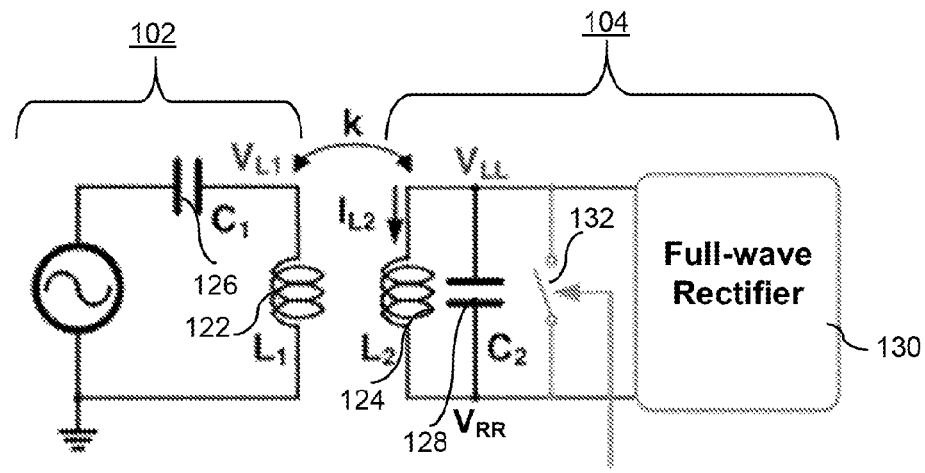
FIG. 1A is a block diagram for an embodiment of the inventive modulation scheme in the power transfer mode.
Figure 1B:
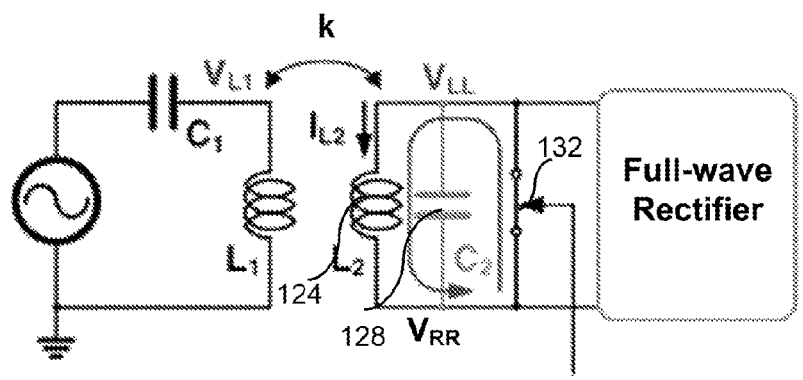
FIG. 1B is a block diagram showing the data transfer mode.

Referring to FIGS. 1A and 1B, the block diagram for the inventive data modulation scheme is same as LSK—the difference lies in the timing when it closes the switch and opens the switch. Briefly, the basic components of the inductive telemetry circuit 100 include an external unit 102 and an internal unit 104, with mutually coupled external coil ($L_1$) 122 and implanted coil ($L_2$) 124. The degree of coupling between these two coils can be described in terms of $M=k\sqrt{L_1 L_2}$ their mutual inductance. The coupling factor, k, corresponds to the proportion of the external coil's 122 field that is captured by the implanted coil 124. The external capacitor ($C_1$) 126 and the implanted capacitor ($C_2$) 128 are used to form tuned-in-series external and tuned-in-parallel implanted circuits, respectively. The tuned circuit achieve a high voltage at the output ($V_{LL}$) of the implanted unit 104 compared with the voltage at the input of the external unit 102 at the frequency of the carrier signal. At the internal unit 104, the received waveform is demodulated and the originally-transmitted binary data is recovered. The received waveform is rectified (at full wave rectifier 130) and regulated to deliver an appropriate supply voltage to the implant. According to the inventive modulation method, as shown in FIG. 1B, switch 132 is closed when all energy of the LC tank is in inductor 124, so the voltage across the LC tank 124,128 is zero and the current through the inductor 124 is at its maximum.

In addition to the modified modulation scheme, the inventive approach uses a multi-phase phase-locked loop (PLL) to control timing in waveform sampling from the sinusoidal voltage signal in the LC tank to adiabatically convert and regulate power in generating multiple constant voltage supplies and/or time-varying stimulation voltage signals. This approach provides precise supply and waveform control with minimum power losses, saving energy and avoiding heating of biomedical implants and other wireless sensors and actuators.

Figure 1C:
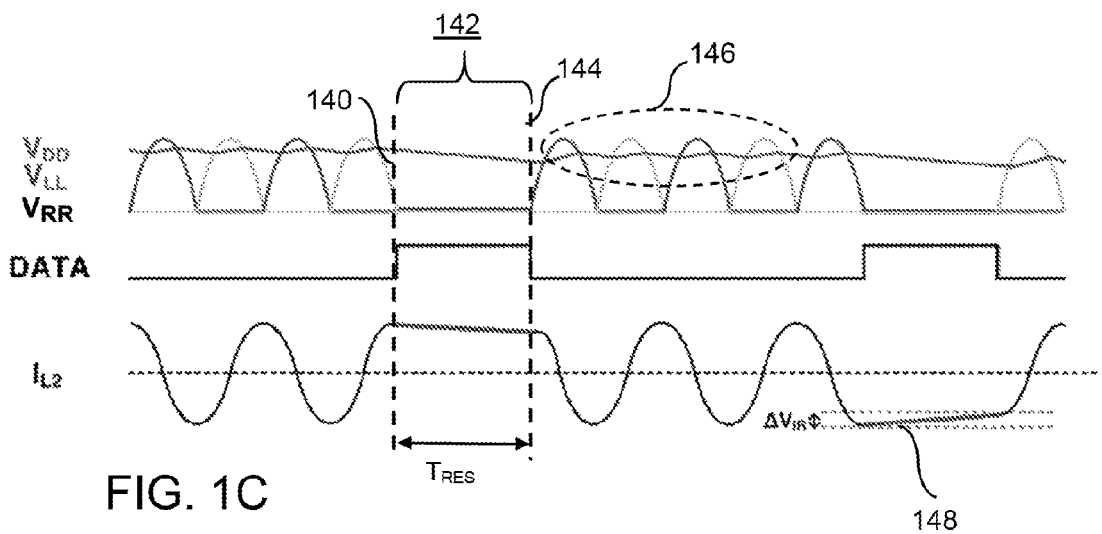
FIG. 1C diagrammatically illustrates the proposed modulation scheme.
Figure 1D:
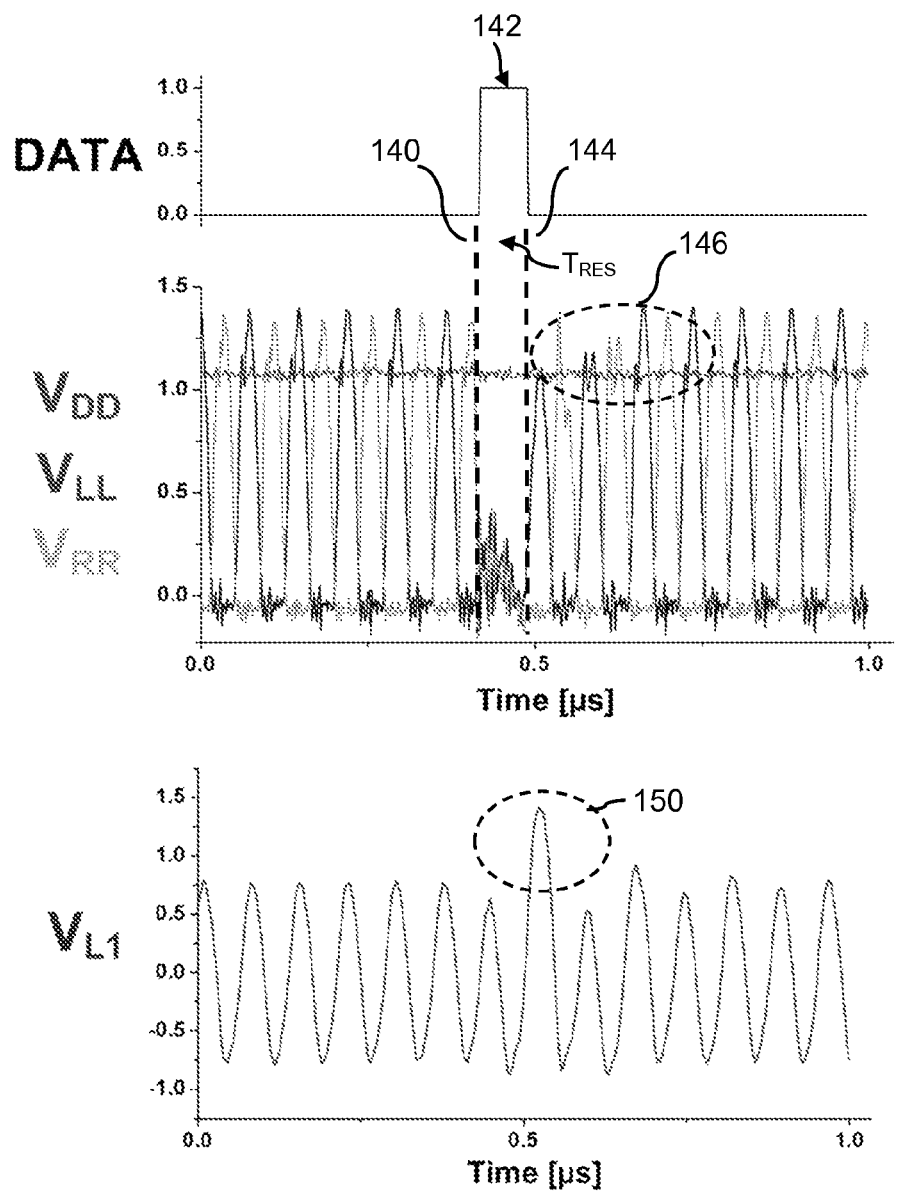
FIG. 1D shows the measured waveforms of the data modulation scheme at the secondary and primary sides.

The inventive approach for uplink data modulation involves closing the switch across the secondary parallel LC tank for an entire single cycle. Referring to FIGS. 1C and 1D, the switch 132 begins to close when the voltage across the inductor ($L_2$) 124 is zero and the current $I_{L2}$ is at maximum (time point 140). During the shorted cycle 142, the constant current circulates through the inductor, instantaneously disrupting the inductive coupling to the primary side resulting in a voltage change $\Delta V_{L1}$. During the shorted phase, there is no charge dissipation in the LC tank except through the parasitic resistances of the inductor and switch. As shown in FIGS. 1C and 1D, $V_{LL}$ and $V_{RR}$ resume oscillation at the same phase (time point 144), recovering to the peak resonance amplitudes within a few cycles 146. This technique does not disturb resonance, so it does not compromise the high Q of the coil for resonant power transfer, unlike most other data telemetry schemes. The full-cycle shorting can be phase shifted for the opposite polarity 148. FIG. 1D provides a sample measurement for data transmission including responses at the primary coil 122, which demonstrates a clear peak 150 in the voltage $V_{L1}$ across the coil.

Figure 2A:
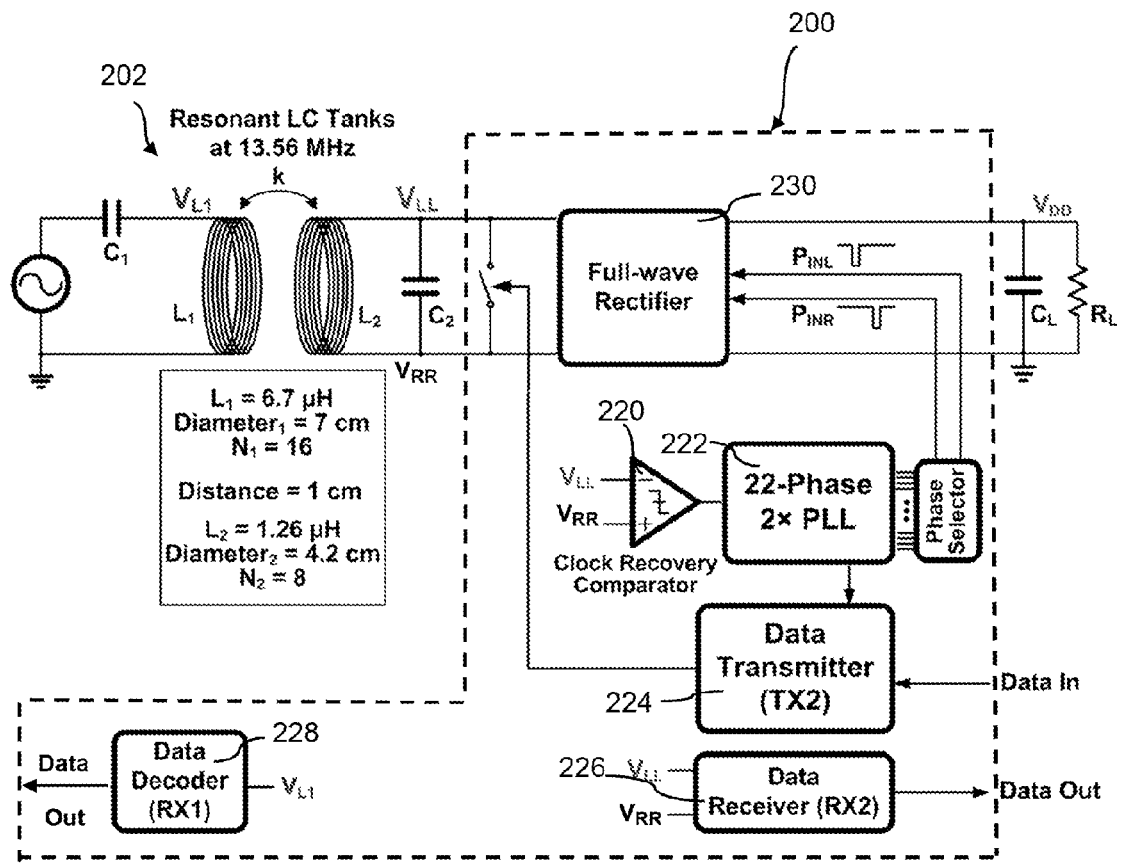
FIG. 2A is an exemplary system block diagram according to an embodiment of the invention.

FIG. 2A provides an schematic diagram of an exemplary embodiment of the inductive link at the 13.56-MHz ISM band 202 and the power/data telemetry IC 200 according to the invention. The inductors $L_1$ and $L_2$ were implemented using PCB-based planar coils with the following parameters: $L_1$=6.7 μH, diameter=7 cm and number of windings ($N_1$)=16; $L_2$=1.26 μH, diameter=4.2 cm and $N_2$=8. A low-power slow common-gate comparator 220 recovers a clock from the LC tank ($L_2 C_2$). The clock 220 is fed to a phase-locked loop (PLL) 222, which generates signals for data transmission by transmitter 224. In the exemplary embodiment, PLL 222 is a 22 phase 2× PLL for multi-phase based rectification and regulation. The PLL's inputs may be masked when transmitting data.

Figure 2B:
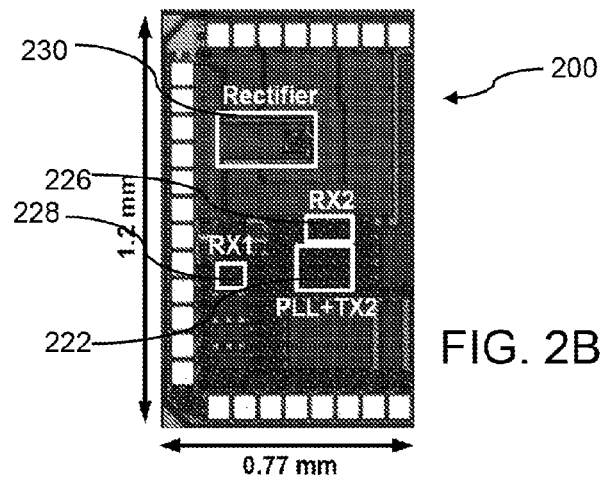
FIG. 2B is a micrograph of an actual integrated circuit implementation of the embodiment of FIG. 2A.
Figure 2C:
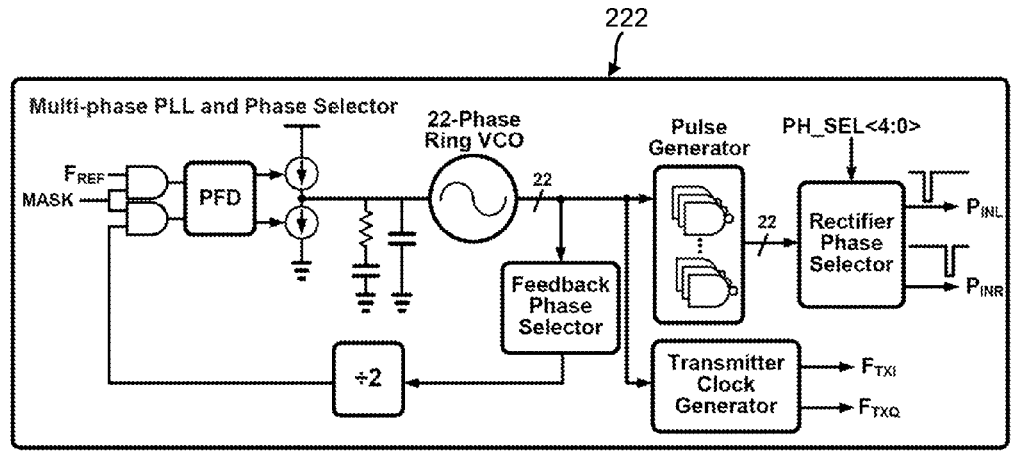
FIG. 2C is a circuit schematic for an exemplary multi-phase PLL and phase selector for use in an embodiment of the invention.
Figure 2D:
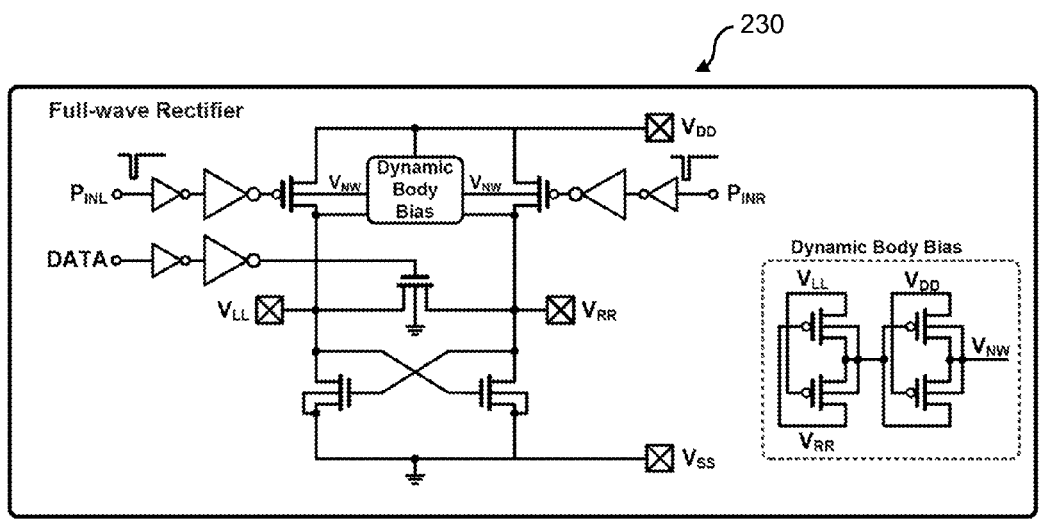
FIG. 2D is a circuit schematic for an exemplary full-wave rectifier for use in an embodiment of the invention.

The circuit 200, which was fabricated into a 1.2 mm×0.77 integrated circuit using a standard IBM 65 nm CMOS process, also includes data receivers 226 and 228 in each side. FIG. 2B is the micrograph of the actual fabricated IC. The total chip area is 0.92 mm$^2$. The areas of the various blocks are: full wave rectifier 230: 0.04 mm$^2$, PLL+Tx2 222: 0.029 mm$^2$, Rx1 226: 0.006 mm$^2$, and Rx2 228: 0.009 mm$^2$. A schematic for PLL 222 with a 22-phase ring VCO and a divider-by-2 is provided in FIG. 2C. PLL 222 doubles the incoming clock from the low power clock recovery common-gate comparator. The PLL and phase selector 222 generate phase-tuned pulses $P_{INL}$ and $P_{INR}$ gating the pMOS switches of the full-wave rectifier 230 shown in FIG. 2D. The rectifier has nMOS cross-coupled pair and pMOS switches. During data transmission, the clocks to PFD are gated for more stable PLL operation. The dynamic body bias generator (inset in FIG. 2D) tracks the highest voltage among $V_{LL}$, $V_{RR}$ and $V_{DD}$. The nMOS across $V_{LL}$ and $V_{RR}$ act as the shorting switch (132 in FIGS. 1A and 1B) for data transmission.

Figure 3A:
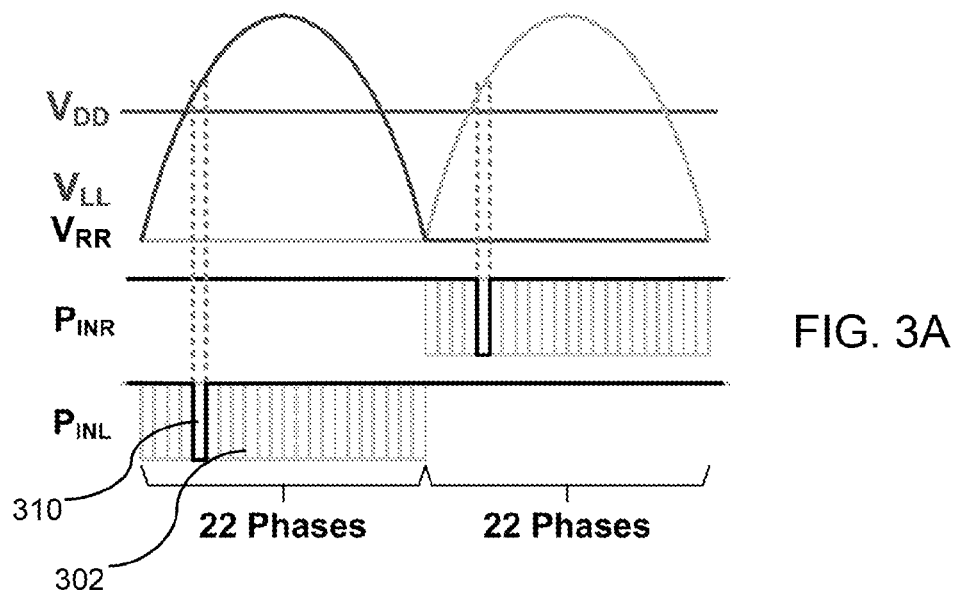
FIG. 3A is an illustration of phase-based rectification.
Figure 3B:
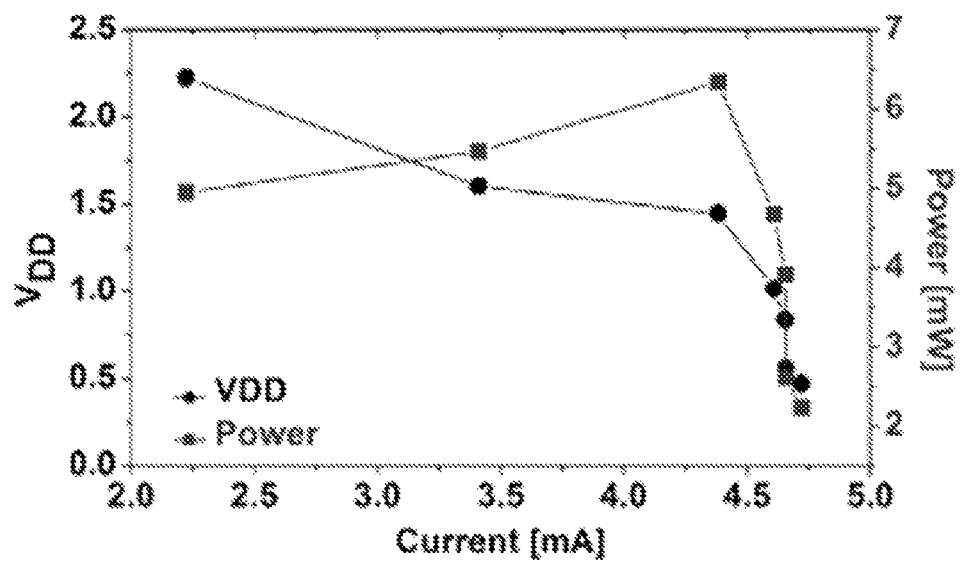
FIG. 3B is a plot of rectified $V_{DD}$ and power over load current.
Figure 3C:
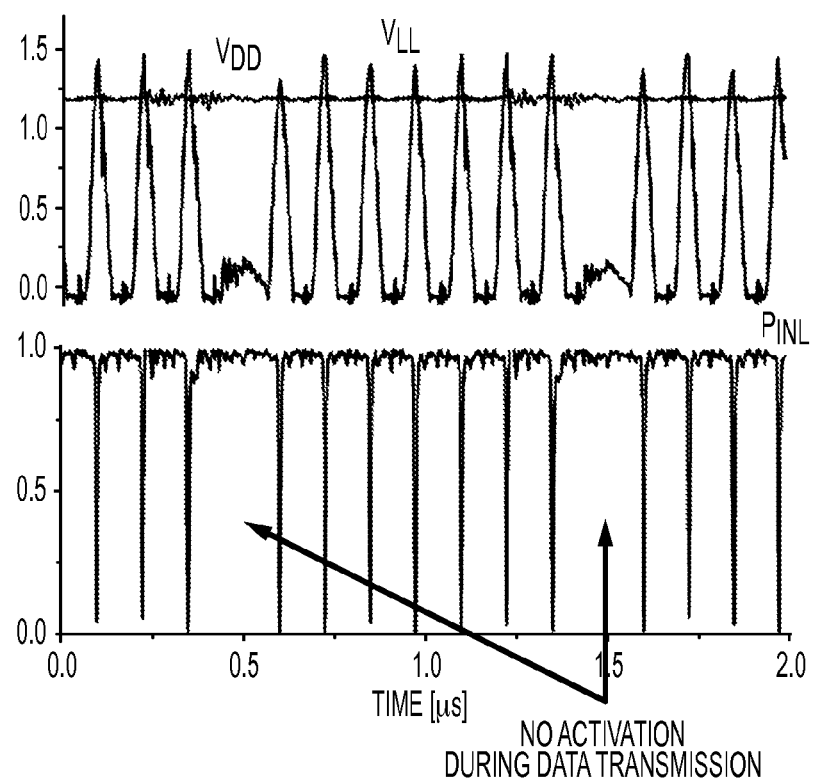
FIG. 3C shows recorded waveforms for rectification during data transfer.

Rather than employing a high-speed scheme using an offset-controlled comparator, the inventive approach uses a slow lower-power clock recovery comparator and digital logic, and a multi-phase PLL for synchronizing and generating timing control signals for rectification and data transmission. Selecting a PLL feedback clock and controlling the phase delay of the VCO finely compensates the response delay of the comparator, aligning the 22 phases 302 over a half cycle, as depicted in FIG. 3A. One pulse 310 of the 22 phase pulses 302 is selected to close the pMOS switches, extracting charge from the LC tank, inducing a corresponding rectified $V_{DD}$. FIG. 3B shows the rectified $V_{DD}$ and power over load current with this rectification technique. The maximum transferred power to the load is 6.3 mW. FIG. 3C shows measured waveforms of $V_{LL}$, $V_{DD}$ (upper) and the rectification pulse $P_{INL}$ (lower), respectively.

Figure 4A:
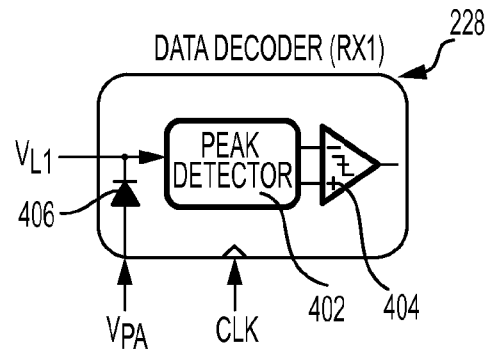
FIG. 4A is a simplified diagram of an embodiment of the data decoder (RX1) at the primary with the peak-aligning diode.
Figure 4B:
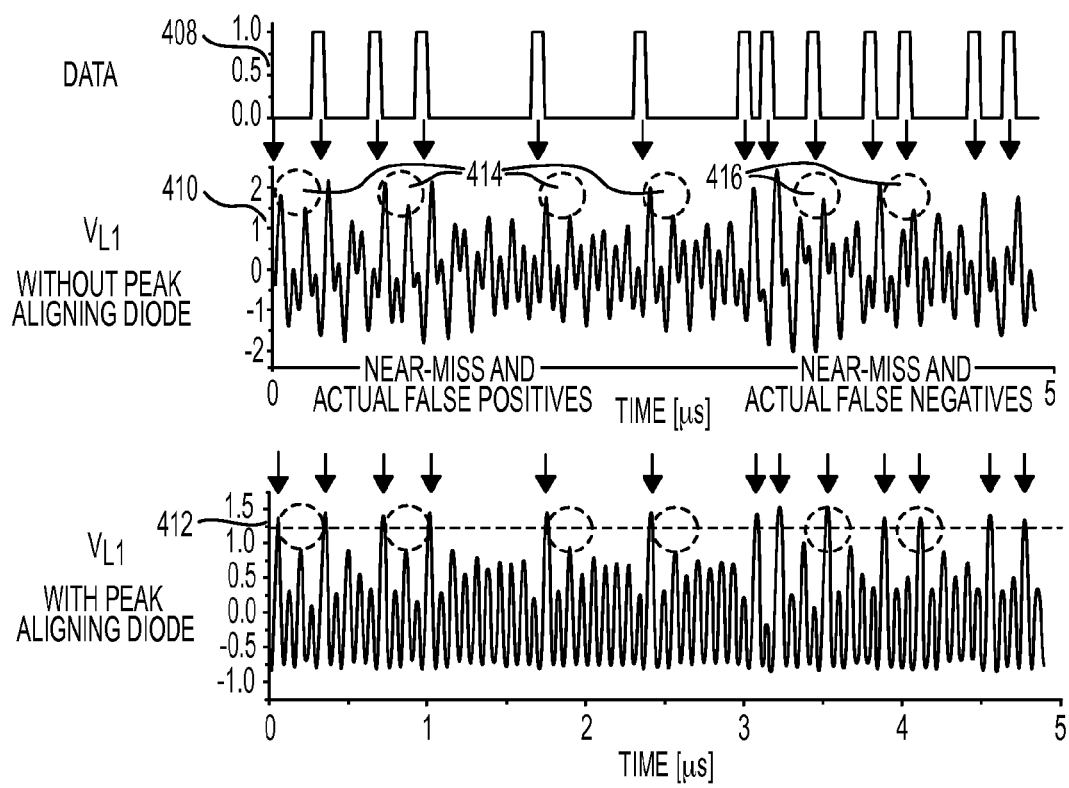
FIG. 4B shows the recorded $V_{L1}$ signal for data decoding at the primary, and the effect of the peak-aligning diode on decoding performance.

FIG. 4A illustrates the data receiver (decoder) (RX1) 228 that resides at the primary side shown in FIG. 2A. Data receiver 228, which includes a peak detection circuit 402 and a clocked comparator 404, aligns low peaks of $V_{L1}$ in order to clarify distinct high peaks enhancing bit error rate (BER) as shown in FIG. 4B. Sample input data 408 at a rate of 6.78 Mbps is shown in FIG. 4B. Signal 410 illustrates a sample measurement for multiple data transmission without control of voltage $V_{L1}$. As indicated, there are many near-miss and actual false positives 414 and false negatives 416 due to the fluctuation in the LC oscillation. It is important for these peaks to be reliably detected, so the inventive approach sets a threshold voltage by applying a DC bias voltage $V_{PA}$ to $V_{L1}$ through a peak-aligning diode 406, shown in FIG. 4A. As indicated by the sample measurement signal 412, false detections are removed by aligning the waveform.

Figure 5A:
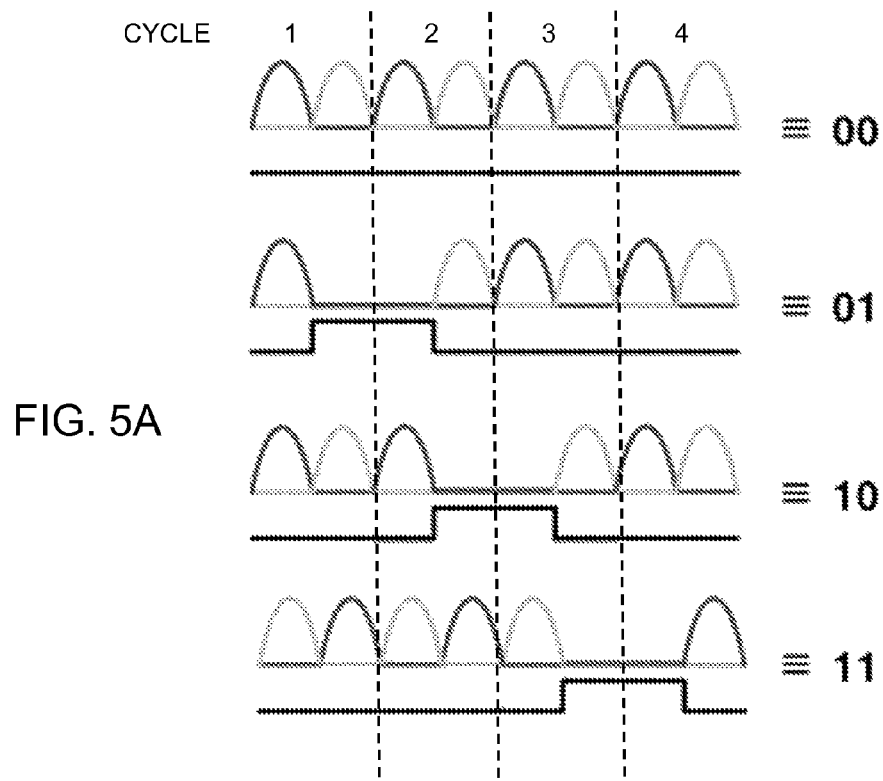
FIG. 5A illustrates the time-based symbol bit mapping according to an embodiment of the invention.
Figure 5B:
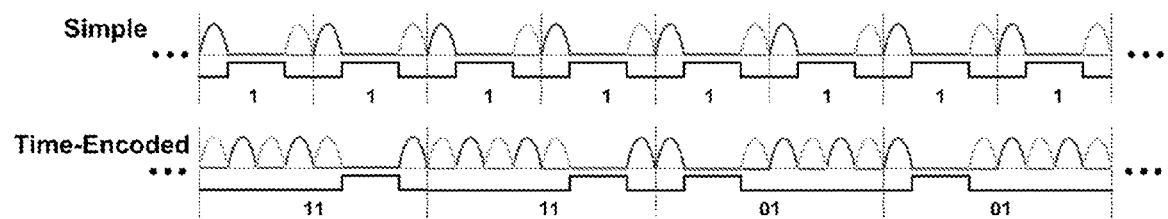
FIG. 5B provides a comparison of the inventive time-based encoding versus a simple encoding approach used in the prior art.

Because the timing of a bit can be precisely detected, a cyclic on-off keying (COOK) time-encoded symbol bit mapping, shown in FIG. 5A, can be used to encode two bits within four cycles. On average, three shorts per 16 cycles are required to achieve 6.78 Mbps data transfer rate while simultaneously rectifying for 81.25% of the time. FIG. 5B provides a comparison of the inventive encoding approach against a simple data encoding scheme such as is used in the prior art (upper), where shorting occurs once for every two cycles encodes 1 bit, resulting in a bit rate of 3.39 Mpbs. Using the inventive timing-based encoding, or pulse-position encoding, as shown in the lower portion of FIG. 5B, shorting only once per four cycles (or 3 per 16 cycles in average), achieves 6.78 Mbps in 13.56 MHz carrier, while reserving more than 80% time for power delivery (i.e., LC oscillation and rectification.)

Figure 5C:
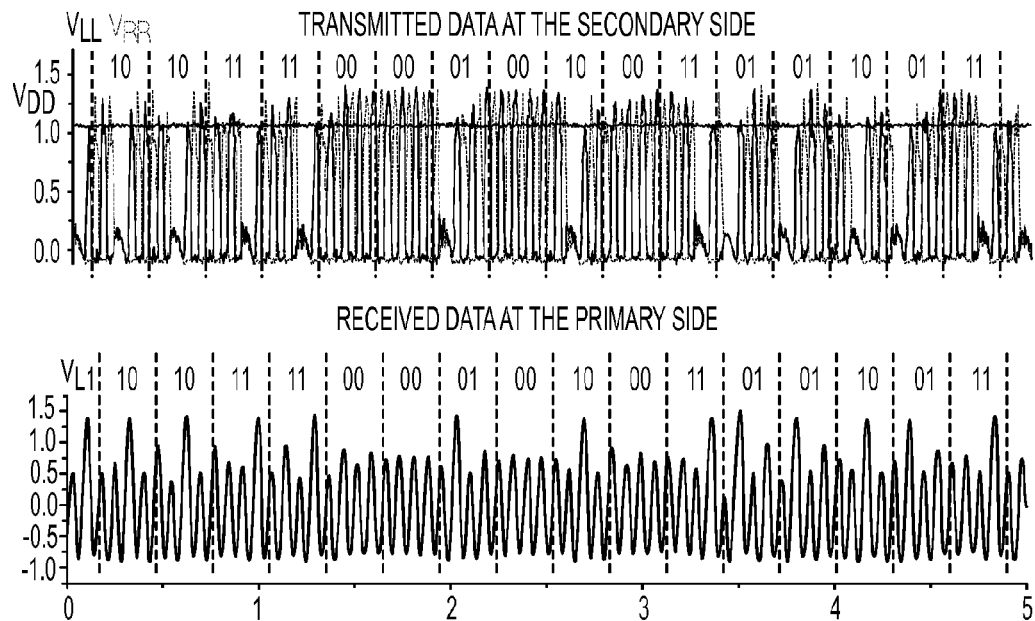
FIG. 5C shows recorded transmitted and received data.
Figure 5D:
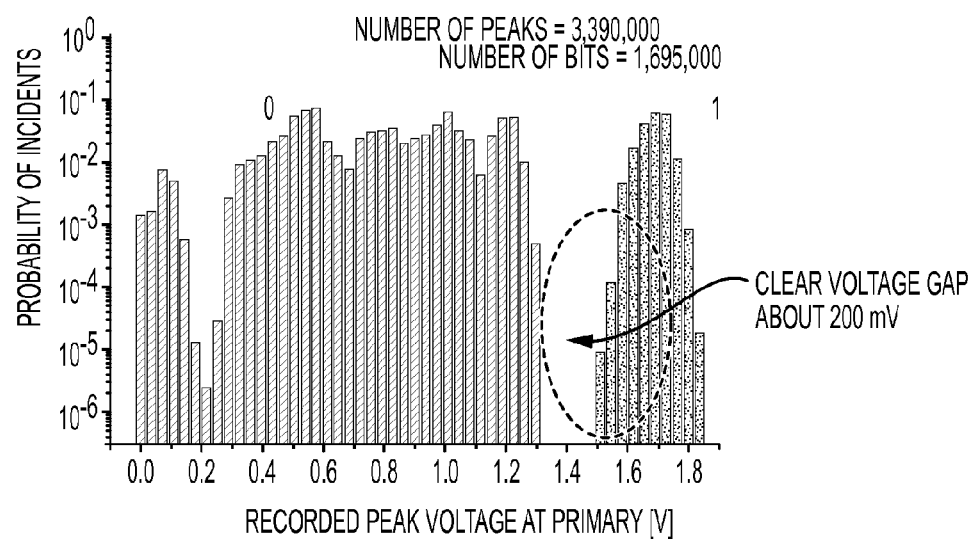
FIG. 5D is a histogram of the peak values of $V_{L1}$.

FIG. 5C shows recorded waveforms with the symbol mapping for transmission at the secondary and reception at the primary. No error was detected over 1.695 million bits transmitted, upper-bounding the BER at $5.9 \times 10^{-7}$. The BER is estimated to be $2 \times 10^{-9}$ using the histogram shown in FIG. 5D. A clear voltage gap of about 200 mV is reflected.

Figure 6A:
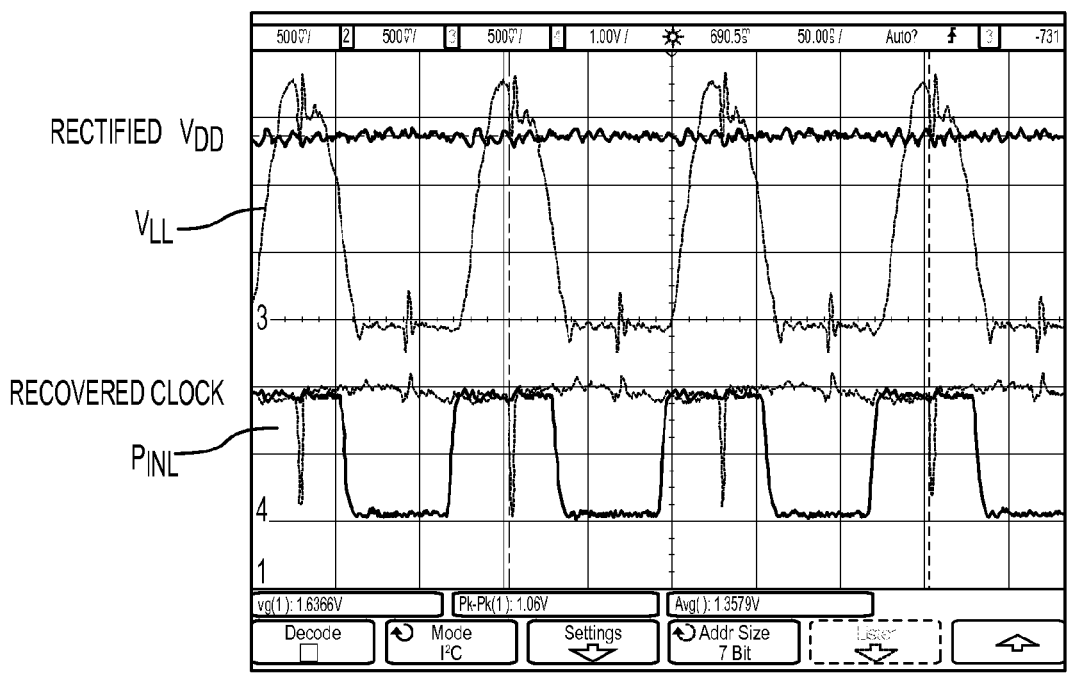
FIG. 6A is a plot of measured waveforms showing rectification according to an embodiment of the invention.
Figure 6B:
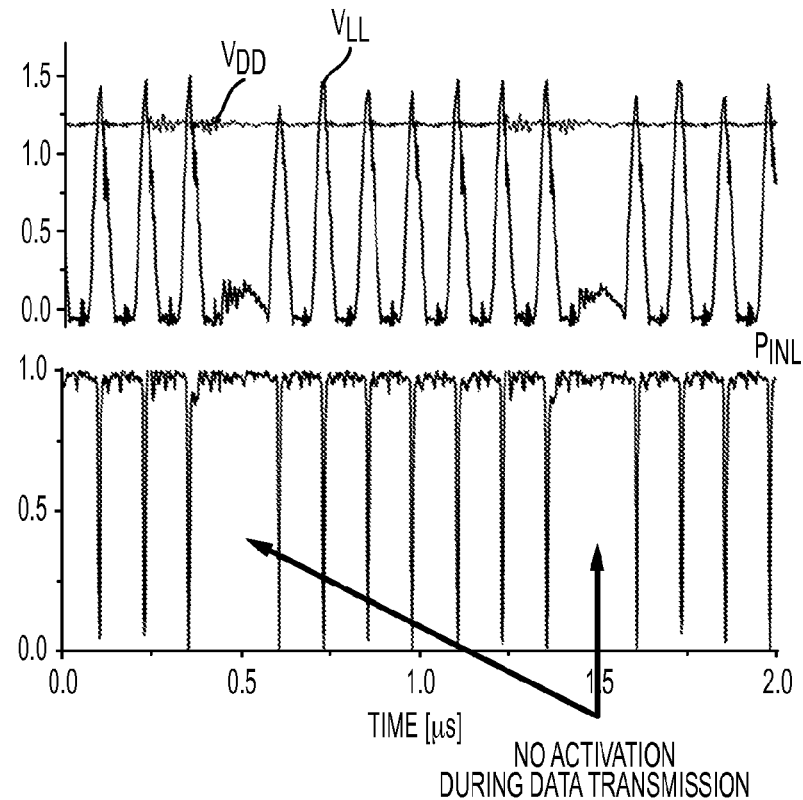
FIG. 6B shows measured signals generated during transmission and rectification.
Figure 6C:
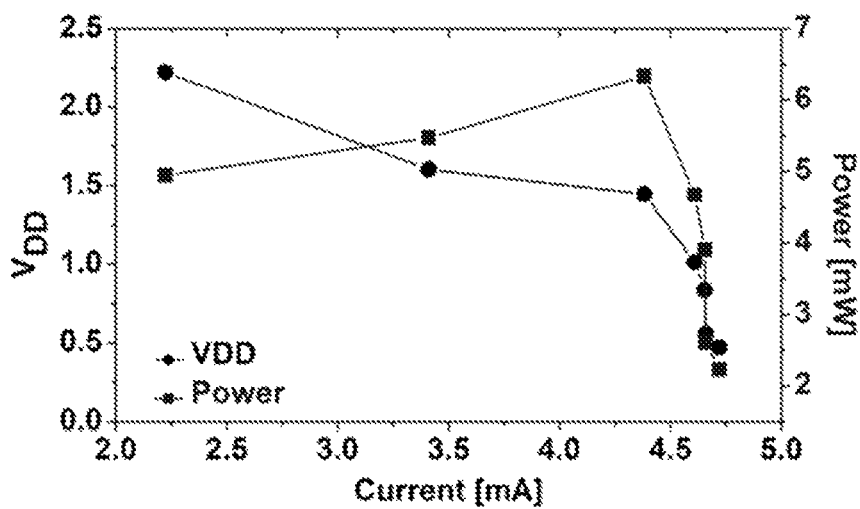
FIG. 6C is a plot of rectified voltage and power with current.

FIGS. 6A-6C illustrate rectification results obtained using the inventive modulation scheme. FIG. 6A shows the measured waveforms, where one pulse of the 22 phase pulse is used to close the pMOS switches to extract power from the LC tank. Digital logic coordinates data transmission and rectification. As indicated in FIG. 6B, $V_{LL}$ drops and remains near 0 during data transmission. FIG. 6C shows the rectified $V_{DD}$ and power with current. Power can be delivered up to 6.3 mW.

Tables 1 and 2 below provide performance comparisons between the inventive modulation scheme (COOK) and various approaches reported in the literature.

TABLE 1

| Ref | Link | Modulation Scheme | Carrier Freq. [MHz] | Data Rate [Mbps] | Carrier cycle/bit | BER | Energy per bit [pJ/bit] |
|---|---|---|---|---|---|---|---|
| [1] | Single | LSK | 13.56 | 0.1 | 135.6 | N/A | N/A |
| [2] | | LSK | 13.56 | 0.5 | 27.1 | N/A | N/A |
| [3] | | PPSK | 13.56 | 0.85 | 16 | N/A | N/A |
| [4] | | LSK | 400 | 1 | 400 | $<1.7 \times 10^{-7}$ | N/A |
| This Work | Single | COOK | 13.56 | 6.78 | 2 | $<6 \times 10^{-7}$ | 3.5 |

References:
[1] W. Xu et al., IEEE TCAS II, 56(9), pp. 714-718, 2009
[2] H.-M. Lee et al., IEEE TCAS I, 58(8), pp. 1749-1760, 2011
[3] D. Cirmirakis et al., Proc. IEEE ESSCIRC, pp. 301-304, 2012
[4] R. Muller et al., ISSCC Digest Tech. Papers, pp. 412-413, 2014

TABLE 2

| Ref | Link | Modulation Scheme | Carrier Freq. [MHz] | Data Rate [Mbps] | Carrier cycle/bit | BER | Energy per bit [pJ/bit] |
|---|---|---|---|---|---|---|---|
| [1] | Single | LSK | 13.56 | 0.1 | 135.6 | N/A | N/A |
| [2] | | LSK | 13.56 | 0.5 | 27.1 | N/A | N/A |
| [3] | | PPSK | 13.56 | 0.85 | 16 | N/A | N/A |
| [4] | | LSK | 400 | 1 | 400 | $<1.7 \times 10^{-7}$ | N/A |
| [5] | Multiple | LSK | 25 | 2.8 | 8.9 | $<10^{-6}$ | 35.7 |
| [6] | | OQPSK | 13.56 | 4.16 | 3.3 | $2 \times 10^{-6}$ | N/A |
| [7] | | BPSK | 48 | 3 | 16 | $2 \times 10^{-4}$ | 1962 |
| This Work | Single | COOK | 13.56 | 6.78 | 2 | $<6 \times 10^{-7}$ | 3.5 |

[1] W. Xu et al., IEEE TCAS II, 56(9), pp. 714-718, 2009
[2] H.-M. Lee et al., IEEE TCAS I, 58(8), pp. 1749-1760, 2011
[3] D. Cirmirakis et al., Proc. IEEE ESSCIRC, pp. 301-304, 2012
[4] R. Muller et al., ISSCC Digest Tech. Papers, pp. 412-413, 2014
[5] S. Mandal et al., IEEE TBioCAS, 2(4), pp. 301-315, 2008
[6] G. Simard et al., IEEE TBioCAS, 4(3), pp. 192-200, 2010
[7] A. Rush and P. R. Troyk, IEEE TBME, 59(11), pp. 3255-3262, 2012

The inventive modulation scheme described herein, "Cyclic on-off keying (COOK)", allows simultaneous transmission of power and broadband data, at a bit rate of half the carrier frequency, over the same resonant inductive link. Data-synchronous adiabatic switching in COOK retains almost all stored energy in the LC resonant tank during modulation of the carrier signal, and incurs minimum power losses during rectification. A 0.92 mm² CMOS COOK prototype in 65 nm CMOS transmits 6.78 Mbps data at 3.5 pJ/bit and delivers up to 6 mW of power over a single 13.56-MHz inductive link.

The inventive modulation scheme provides a significant improvement with respect to energy efficiency, as indicated by the summary provided in Table 3 below showing the power consumption for each block within the charge recycling power/data telemetry IC (e.g., as shown in FIGS. 2A and 2B).

TABLE 3

| Block | Power Consumption [µW] |
| --- | --- |
| Clock-recovery comparator | 0.33 |
| PLL (2x, 22-phase, $f_{vco}$ = 27.12 MHz) | 9.32 |
| Voltage bias generator | 0.45 |
| TX clock generator | 3.43 |
| TX data controller | 0.94 |
| TX switch driver (fanout = 4, $R_{SW}$ = 0.14 Ω) | 9.29 |
| Total | 23.76 |

The present invention provides a significant advancement over the existing art, allowing transmission of broadband data at a bit rate of half the carrier frequency while efficiently transmitting power over the same resonant inductive link. Using novel synchronous cyclic on-off keying (COOK), the device retains almost all stored energy in the LC (inductor-capacitor) resonant tank during modulation of the carrier signal. Hence, it is able to achieve very high data rate with very low power.

In addition, the invention uses a multi-phase phase-locked loop (PLL) to control timing in waveform sampling from the sinusoidal voltage signal in the LC tank to adiabatically convert and regulate power in generating multiple constant voltage supplies and/or time-varying stimulation voltage signals. This feature allows the device to perform precise supply and waveform control with minimum power loss, saving energy and avoiding heating of biomedical implants and other wireless sensors and actuators.

The following references are incorporated herein by reference as disclosing the general state of the art in the field of the invention.
[1] S. Ha et al., Proc. IEEE ESSCIRC, pp. 141-144, 2013;
[2] Z. Tang et al., IEEE TBME, 42(5), pp. 524-528, 1995;
[3] W. Xu et al., IEEE TCAS II, 56(9), pp. 714-718 2009;
[4] H.-M. Lee et al., IEEE TCAS I, 58(8), pp. 1749-1760, 2011;
[5] Mandal et al., IEEE TBioCAS, 2(4), pp. 301-315, 2008;
[6] G. Simard et al., IEEE TBioCAS, 4(3), pp. 192-200, 2010;
[7] D. Cirmirakis et al., Proc. IEEE ESSCIRC, pp. 301-304, 2012;
[8] S. Ha et al., Proc. IEEE VLSI Symposium, to appear, 2014.

The invention claimed is:

1. A telemetry device, comprising:
an inductive link comprising an external LC tank and an internal LC tank, wherein the inductive link is resonant at a carrier frequency comprising a plurality of cycles;
a switch configured for shorting the internal LC tank in response to a data-synchronized modulation signal; and
a modulator assembly configured to implement cyclic on-off keying to open and close the switch, wherein the switch is closed for data transmission and open for power transfer, the modulator assembly comprising:
a full wave rectifier;
a clock-recovery comparator;
a phase-locked loop configured for generating a plurality of pulses; and
a phase selector configured to select at least one pulse from the plurality of pulses for input to the rectifier.

2. The telemetry device of claim 1, wherein the modulator assembly causes the switch to close for a full cycle within the plurality of cycles.

3. The telemetry device of claim 1, wherein the carrier frequency is 13.56 MHz.

4. The telemetry device of claim 1, wherein data transmission occurs at a data bit rate on the order of one half of the carrier frequency.

5. The telemetry device of claim 1, wherein the phase selector uses feedback phase selection.

6. The telemetry device of claim 1, wherein the phase selector selects a first pulse for closing the switch and a second pulse for opening the switch.

7. The telemetry device of claim 1, further comprising a data decoder configured for receiving an input data transmission, the data decoder comprising a peak detector and a comparator.

8. The telemetry device of claim 7, wherein the data decoder further comprises a peak-aligning diode configured to set a threshold voltage at the external LC tank.

9. A telemetry device, comprising:
a resonant inductive link comprising a primary LC tank and secondary LC tank configured to resonate at a carrier frequency comprising a plurality of cycles;
a modulator assembly in communication with the secondary LC tank and configured to implement cyclic on-off keying modulation to periodically create a short across the secondary LC tank in response to a pulse, wherein data is transmitted across the inductive link when the secondary LC tank is shorted and power is transferred across the inductive otherwise, and wherein the modulator assembly comprises:
a switch configured for creating the short;
a full wave rectifier configured for controlling the switch;
a phase-locked loop configured for generating a plurality of pulses;
a clock-recovery comparator configured to provide an input to the phase-locked loop; and
a phase selector configured to select at least one pulse from the plurality of pulses for input to the rectifier.

10. The telemetry device of claim 9, wherein the modulator assembly causes the switch to close for a full cycle within the plurality of cycles.

11. The telemetry device of claim 9, wherein the data has a bit rate on the order of one-half of the carrier frequency.

12. The telemetry device of claim 9, wherein the phase selector uses feedback phase selection.

13. The telemetry device of claim 9, wherein the phase selector selects a first pulse for closing the switch and a second pulse for opening the switch.

* * * * *